US011115792B2

(12) United States Patent
Kong

(10) Patent No.: US 11,115,792 B2
(45) Date of Patent: Sep. 7, 2021

(54) VEHICULAR HIGH-SPEED NETWORK SYSTEM

(71) Applicant: Jiejun Kong, Jurupa Valley, CA (US)

(72) Inventor: Jiejun Kong, Jurupa Valley, CA (US)

(*) Notice: Subject to any disclaimer, the term of this patent is extended or adjusted under 35 U.S.C. 154(b) by 99 days.

(21) Appl. No.: 16/566,666

(22) Filed: Sep. 10, 2019

(65) Prior Publication Data

US 2020/0021962 A1  Jan. 16, 2020

Related U.S. Application Data

(63) Continuation-in-part of application No. 15/623,400, filed on Jun. 15, 2017, now abandoned, and a
(Continued)

(51) Int. Cl.
| | |
|---|---|
| *H04W 4/46* | (2018.01) |
| *H04W 64/00* | (2009.01) |
| *H04W 16/28* | (2009.01) |
| *H04W 76/14* | (2018.01) |
| *H04W 4/44* | (2018.01) |

(Continued)

(52) U.S. Cl.
CPC ............... *H04W 4/46* (2018.02); *H01Q 3/04* (2013.01); *H04W 4/44* (2018.02); *H04W 16/28* (2013.01); *H04W 64/006* (2013.01); *H04W 76/14* (2018.02); *H04W 84/005* (2013.01)

(58) Field of Classification Search
CPC ......... H04W 4/46; H04W 4/44; H04W 76/14; H04W 16/28; H04W 84/005; H04W 64/006; H01Q 3/04
See application file for complete search history.

(56) References Cited

U.S. PATENT DOCUMENTS

| | | |
|---|---|---|
| 5,038,149 A | 8/1991 | Aubry et al. |
| 7,218,277 B1 | 5/2007 | Smith |

(Continued)

FOREIGN PATENT DOCUMENTS

CZ           2013297 A3    10/2014

OTHER PUBLICATIONS

Pagadarai et al.; Characterization of Vacant UHF TV Channels for Vehicular Dynamic Spectrum Access; Worcester Polytechnic Institute; 2009; pp. 29-3-1-1 to 29-3-1-8. (Year: 2009).

(Continued)

*Primary Examiner* — Qun Shen
(74) *Attorney, Agent, or Firm* — Cionca IP Law P.C.; Marin Cionca

(57) ABSTRACT

A vehicular high-speed network system having a vehicle, a terminal associated with the vehicle and having a radio rate transformer, and stations each having a radio rate transformer which are connected to a network gateway. The radio rate transformers having a GPS device for providing GPS location data of the first radio rate transformer, an embedded computer system, a VHF/UHF radio connected to the GPS device for transmitting the GPS location data to the embedded computer system, a first sector antenna, a compass for providing a heading angle of the first sector antenna to the embedded computer system, and a broadband radio for establishing high-speed data connection. The stations are connected to the internet and adapted to enable the high-speed data connection to the terminal once the sector antennas have a line of sight connection.

15 Claims, 13 Drawing Sheets

Related U.S. Application Data continuation-in-part of application No. 15/697,416, filed on Sep. 6, 2017, now abandoned.

(51) Int. Cl.
*H01Q 3/04* (2006.01)
*H04W 84/00* (2009.01)

(56) References Cited

U.S. PATENT DOCUMENTS

| | | | |
|---|---|---|---|
| 9,489,813 B1* | 11/2016 | Beigel | G08B 13/2417 |
| 2002/0165669 A1 | 11/2002 | Pinto et al. | |
| 2006/0276992 A1 | 12/2006 | Berg et al. | |
| 2008/0161986 A1 | 7/2008 | Breed | |
| 2010/0045514 A1* | 2/2010 | Bartscher | G01S 13/90 |
| | | | 342/25 R |
| 2010/0045536 A1 | 2/2010 | Fukui et al. | |
| 2010/0292845 A1* | 11/2010 | Burdette | H01Q 3/04 |
| | | | 700/275 |
| 2010/0302014 A1* | 12/2010 | Gloo | G01S 5/04 |
| | | | 340/326 |
| 2012/0013515 A1* | 1/2012 | Berejik | H01Q 3/08 |
| | | | 343/766 |
| 2014/0342675 A1* | 11/2014 | Massarella | H04B 17/00 |
| | | | 455/67.14 |
| 2015/0287312 A1* | 10/2015 | Mantsvetov | G08B 21/0277 |
| | | | 340/906 |
| 2017/0115371 A1 | 4/2017 | Eaton | |
| 2017/0126308 A1* | 5/2017 | Astrom | H04W 28/0226 |
| 2019/0036652 A1 | 1/2019 | Baghel et al. | |
| 2019/0058513 A1* | 2/2019 | Mizusawa | H04B 7/0626 |

OTHER PUBLICATIONS

Ronald k. Jurgen; V2V/V2I Communications for Improved Road Safety and Efficiency; SAI International, Progress in Technology Series; 2012; pp. 163-168. (Year: 2012).

\* cited by examiner

FIG. 10 – Prior Art

VEHICULAR HIGH-SPEED NETWORK SYSTEM

CROSS-REFERENCE TO RELATED APPLICATIONS

This application is a continuation-in-part claims the benefit of U.S. Non-Provisional application Ser. No. 15/623,400, filed Jun. 15, 2017, and it is also a continuation-in-part claims the benefit of U.S. Non-Provisional application Ser. No. 15/697,416, filed Sep. 6, 2017, which are hereby incorporated by reference, to the extent that they are not conflicting with the present application.

BACKGROUND OF INVENTION

1. Field of the Invention

The invention relates generally to wireless data communication, and more specifically point-to-point wireless communication between vehicles.

2. Description of the Related Art

Currently, the broadband network services are not adequate for human or artificial intelligence (AI) to perform commands to operate vehicles in instant real-time from the infrastructure or cloud. Operating vehicles is a fast-paced environment and quick reaction speeds are necessary to avoid breaking traffic laws or even vehicle collisions. Physically, line-of-sight is the fastest connection between two communicating parties; however, with moving vehicles this is difficult to accomplish over a reasonably long distance while complying with FCC regulation. The vehicular communication is currently achieved through an omni-directional on-board method and only works over a short distance. For example, cellular networks providing 4G LTE service typically can cover vehicles within 2 km to 3 km radius from a base station; cellular networks providing futuristic 5G service typically can only cover vehicles within 500 m radius from a base station.

High-speed broadband communication implemented by existing COTS (commercial off the shelf) products normally utilizes channel bandwidth in the range between 10 Mhz and 50 Mhz to reach high data rate in the range from several Mbps to more than 10 Mbps. However, due to the radio frequencies used in these COTS devices (typically around the unlicensed 2.4 Ghz and 5.8 Ghz in frequency, corresponding to approximately 12.5 centimeters and 5.2 centimeters in wavelength), it is difficult for the radio wave to bypass a small obstacle with a size comparable to the wavelength or to penetrate a solid obstacle thicker than several meters. Thus, the constraint of line-of-sight ("LoS") between the transmitter and the receiver is required in long distance broadband wireless communication.

Wireless transmission power is typically measured by two common metrics; the maximum transmitter output power fed into the antenna and the maximum effective isotropic radiated power ("EIRP") transmitted into air after going through the antenna. The EIRP is approximated by adding the transmit output power, in dBm, to the antenna gain in dBi, and adding cable loss if there is loss in the cable feeding the antenna. In most national and international standards, for instance, in the United States, several of the FCC 47 part 15 rules govern the transmit power permitted in the unlicensed frequency bands. In all cases, including the least restrained fixed point-to-point cases, the maximum transmitter output power must not exceed 30 dBm (1 watt). In addition, the maximum EIRP is typically 4 watts (36 dBm), which is the sum of 30 dBm transmitter output power and 6 dBi antenna gain, except in a fixed point-to-point link scenario, where the maximum EIRP allowed is 30 dBm transmitter output power plus 23 dBi of antenna gain, for the 5.15-5.25 GHz and 5.725-5.85 GHz band (FCC rules section 15.245, 15.247, 15.249, 15.407). Moreover, the antenna's physical size cannot be much larger than its underlying vehicle for the installation reasons.

Omni-directional antennas on mobile vehicles may not provide the necessary long-distance communication between vehicles for real time AI control. With omni-directional antennas, the one-hop transmission range is typically less than 3 kilometers by the FCC regulation constraints and physical constraints of antenna dimensions.

The existing COTS products typically provide long-distance wireless broadband connections exclusively in relatively short distance for stationary entities. Providing the same sort of services for mobile entities is a challenge due to their spatial motions (i.e., relative spatial translations and self-rotations).

Omni-directional antennas limit the transmission range because the antenna focuses on rotating and providing transmission to the entire surrounding area. However, an omni-directional antenna does not concentrate the radiation pattern like a directional antenna does. The directional antenna allows for the antenna to focus its transmission area on a specific target space, which increases its transmission range. The transmission range is typically determined by the main lobe of the radiation patterns. The sector antennas are a special kind of beam-forming directional antenna used in telecommunication base station towers to provide sectional coverage of a spatial region and are usually deployed in its vertical position. Typically, since the transmission power for civil broadband communication devices is limited to 30 dBm per most national and international standards, the transmission range of a radio transceiver-antenna combo in a system may be determined by the variations in antenna pattern and antenna gain. The transmission range covered by the main lobe of a directional sector antenna's radiation pattern may increase as the arc degree of the sector decreases, or equivalently, as the antenna gain increases. The narrower the arc may be, the larger the antenna's gain may be, and the longer the radio transmission range may be.

The terms "VHF" and "UHF" are used and are defined by the IEEE (Institute of Electrical and Electronics Engineers) organization. VHF refers to radio frequencies in the range between 30 MHz and 300 MHz by both the IEEE and the ITU (International Telecommunication Union). However, in *IEEE Std* 521-2002 *Standard Letter Designations for Radar-Frequency Bands*, the IEEE defines the UHF radar band as frequencies between 300 MHz and 1 GHz, while the ITU's designation for UHF is in the range between 300 MHz and 3 GHz. The IEEE designations are used so that the term "VHF/UHF radio" refers to a radio operating at a frequency less than 1 GHz. Examples include amateur radios (aka. HAM radios) operating in 2 m band (144-148 MHz in US) or 70 cm band (420-450 MHz in US), marine VHF radios operating in 2 m band (156 MHz or 157 MHz), business VHF radios operating in 2 m band (151 MHz, 154 MHz or 158 MHz), and so on. Currently, the typical data speed implemented over VHF/UHF radio links is measured in Kbps, such as 1.2 Kbps, 4.8 Kbps or 9.6 Kbps, may be available on commercial VHF/UHF radios. For example, such commercial VHF/UHF radios may be sold by Motorola, Kenwood, Yaesu, I-COM, et al.

A mobile vehicle may be implemented as a "cell-on-wheels" or temporary fixed transmitters as in FCC-13-39, page 3500, footnote 2 states that "we propose the term 'fixed' in the Further Notice infra to describe an RF source that is physically secured at one location and is not able to be easily moved to another location while transmitting. Temporary fixed transmitters such as a 'cell-on-wheels' ("COW") or a temporary fixed earth station ("TFES") are considered fixed sources which may be able to be easily moved to another location, but since these types of transmitters are not licensed to transmit while in motion they would also conform to the proposed description of the term 'fixed RF source'." The FCC-compliant EIRP of fixed radio frequency ("RF") sources including temporary fixed RF sources is relaxed up to 52 dBm compared to moving RF sources' 36 dBm. In field tests, this roughly increases the 15 km transmission range upper bound of moving RF sources to 30 km transmission range upper bound of fixed RF sources.

Additionally, radios operating at gigahertz bands may implement high-speed wireless broadband communication with typical data speed larger than 1 Mbps, in some ideal cases larger than 1 Gbps.

However, to be FCC compliant the vehicular communication on gigahertz broadband radios should work in either by a mobile vehicle can function as a temporary fixed transmitter operating at 5.15-5.25 GHz band with 30 dBm transmitter output power and 23 dBi antenna gain or the mobile vehicle must follow the 36 dBm EIRP limit (30 dBm transmitter output power and 6 dBi antenna gain, or in 2.4 GHz band get 3 dBi increase of antenna gain by reducing every 1 dBm transmitter output power rule). The 36 dBm EIRP limit is enforced on all mobile LS terminals. Another option may be a mobile vehicle functioning as a temporary fixed RF source operating at 5.725-5.85 GHz band with 52 dBm EIRP, only if the vehicle will not transmit on the gigahertz radio when moving to a new location and transmits only when stopped, as mobile LS stations are designed to function as such temporary fixed RF sources.

When implementing a directional antenna, the rotation patterns of the moving vehicles need to be considered. There are two types of rotations relative rotations and self-rotations with three sub rotation types in each. For relative rotations there are relative-yaw-rotations, relative-pitch-rotations, and relative-roll-rotations. For example, for relative-yaw-rotations when two common vehicles that are eight or more kilometers apart from each other, the typical yaw-axis angular speed caused by relative spatial translations is expected to be less than 0.07 radian/second (4 degrees/second) for two vehicles moving apart, each at the very high speed of 1000 kilometers/hour (e.g., of Elon Musk's futuristic high-speed bullet trains), along the tangent lines of their communication direction. However, the overall degree of such gradual yaw-rotations is unbounded. For example, relative-pitch-rotations are caused by high variations in the terrain with surface vehicles. Nevertheless, the angle of elevation is only 53 degrees from a surface vehicle at the sea level to another surface vehicle 10 km away at the top of Mount Everest (the highest mountain on earth), thus the corresponding relative-pitch-rotation is typically within our range of ±60 degrees even considering the most extreme terrain variation on earth. For relative-roll-rotations are caused by the self-rotations of both vehicles.

For self-rotations there are self-yaw-rotations, self-pitch-rotations, and self-roll-rotations. Self-yaw-rotations of a typical vehicle are unbounded in overall degrees but with a gradual delay. Most vehicles cannot perform a yaw-axis full circle within certain time limit due to the physical limit in steering mechanisms. For example, the minimal time limit may be set to 6-second, which means a yaw-axis angular speed less than 1 radian/second (58 degrees/second). Most vehicles available on the nowadays market is slower than this angular speed when doing self-yaw-rotations. For surface vehicles, pitch-axis self-rotations are typically caused by hillslopes for terrestrial vehicles or by wave flows for maritime vehicles. Large self-pitch-rotations are relatively uncommon. In particular, a more than ±60 degrees self-pitch-rotation corresponds to a slope steeper than 173% grade in US traffic signs. When referring to terrestrial vehicles a high pitch is impossible for properly running terrestrial vehicles because the steepest street is less than 40% grade. When referring to maritime vehicles a properly running maritime vehicle may not stand in a position steeper than ±60 degrees on the pitch-axis for more than a brief moment. It may travel forward and enter a less steep position after hitting the trough of a wave, but it may not exceed the 60 degrees on the pitch-axis.

For self-roll-rotations, a roll-rotation itself does not affect radio transmission because the receiving vehicle stays at the same spot in the transmitting vehicle's radio radiation pattern in spite of arbitrary roll-rotations. This means that roll-rotations may not affect radio transmissions when the other two (yaw and pitch) axes are properly aligned.

Currently, rotational patterns of civilian vehicles may be simpler than the ones of some military vehicles because it is not atypical for some military vehicles, e.g. fighter jets, to perform unbounded pitch-rotations and roll-rotations. In contrast, a surface vehicle or a rotorcraft can hardly perform 180-degree (±90 degree) rollover. Typically, for most properly functioning civilian vehicles, for example automobiles, boats, ships, buoys, rotorcrafts and blimps, the pitch-rotations and roll-rotations are normally bounded by the range between ±30 degrees, sometimes ±45 degrees and ±60 degrees. Usually, it is unlikely for surface vehicles and rotorcrafts to rotate out of the range of ±60 degrees on the pitch-axis or the roll-axis. Generally, a 60-degree rollover means an accident may have occurred for these civilian vehicles.

The surface vehicle's antenna height and the line of sight communication range allow for maximum communication for the system. Considering that the effect of atmospheric refraction is negligible, distance to the horizon from an observer close to the Earth's surface is about $$d \approx 3.57\sqrt{h}$$

where d is in kilometers and h is height above the ground level in meters. For example, for a 20 km line of sight distance between two identical vehicles, either vehicle must maintain a 10 km distance to the horizon so that each other's crown is visible. The antenna height calculated is approximately 7.8 meters. Since every surface vehicle has a limited antenna height, the line of sight distance between any two surface vehicles is also limited. The actual communication range of short-wavelength broadband radios is thus approximately the smaller one of the line of sight distance and the radio transmission range in vacuum free space communication range=min (line of sight distance, radio transmission range)

The line of sight distance may be smaller than the radio transmission range. When this is true, increasing the radio transmission range by using an antenna with larger gain would not be beneficial because of the limited line of sight range.

For two communicating surface vehicles, the line of sight distance may be estimated based on their antenna heights as well as the radio transmission range based on transmission power and antenna gains. If the radio transmission range is greatly larger than the line of sight distance, the antenna may be switched to an antenna with smaller gain, which allows for the other dimensions of the system's performance metrics, such as the sector range ±D, to be improved.

Therefore, there is a need to solve the problems described above by proving a system for faster and more efficient broadband communication.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, vehicular high-speed network system is provided, the device having a broadband link, which is a direct and dedicated link to the system to provide fast network connection. This link allows for a long radius and a short latency, meaning there may be less than a 10-millisecond ping delay between the system and the vehicle. Thus, an advantage is a faster connection, which allows for applications like AI to have the reaction speed needed when operating a vehicle. A Long-and-Safe station ("LS station") may be a base station equipped with such broadband device to provide real-time (<10 ms delay) and MPEG video-capable (>2 Mbps) network service to its moving clients. It may be stationary as installed on fixed radio towers, or mobile as installed on specially made vehicles. It may be equipped with super-computers and cutting-edge applications such as AI self-driving systems. It may be equipped with various sensors to accumulatively gather environmental information, such as weather conditions, around the station's installation site. It covers up to 15 km radius for moving vehicles, and up to 25 km radius for vehicles classified as FCC temporary fixed sources defined in FCC-13-39A1. A Long-and-Safe terminal ("LS terminal") may be a common vehicle served by LS stations. Examples of LS terminals include ground automobiles, maritime ships and boats, aerial vehicles like aircrafts and UAVs. Thus, another advantage is a longer range of high-speed connection.

In another aspect, a vehicular high-speed network system is provided, the device having a sector antenna placed in the horizontal plane. Placing the antenna on the horizontal plane may allow for the antenna to cope with ±60-degree pitch-axis movement of the underlying vehicle. Thus, an advantage is a line of sight connection between vehicles traveling on different surfaces and a line of sight connection between the vehicle and the stationary LS stations.

In another aspect, a vehicular high-speed network system is provided, the system may be the integration of a horizontally placed sector antenna on a digitally controlled mechanical rotary unit. The line of sight between the transmitting vehicle and the receiving vehicle is along the roll-axis may be significant to high speed wireless connection. This line of sight may be achieved by gradual yaw-axis rotations of unbounded degrees and abrupt pitch-axis rotations up to ±60 degrees of the system to maintain the line of sight.

In another aspect, a vehicular high-speed network system is provided and may use the original azimuth radiation pattern of the sector antenna as the vertical dimension to cover pitch rotations in an instant manner without incurring mechanical overheads. The center line of the sector antenna's vertical sector arc may be pointed to the remote horizon line, thus the receiving vehicle may be covered by the transmitting vehicle's radiation pattern in spite of ±D degree pitch-rotations, where D may be as large as 60 by modern technology. The original elevation radiation pattern of the sector antenna may become the horizontal dimension affecting yaw-rotations, which may be counteracted by a horizontal mechanical rotary driven by a digitally controlled motor. Thus, an advantage is a longer connection range and namely unbounded but gradual yaw-rotations and up to ±60-degree abrupt pitch-rotations.

In another aspect, a vehicular high-speed network system is provided, the system's antennas may maintain a line of sight connection regardless of the roll-rotations because they do not affect radio transmissions when the other two axes are properly aligned. This may be due to most low-orbit satellite antennas not being affected by the roll-rotations and may work as long as the other two axes are properly aligned. Thus, an advantage is strong wireless connection regardless of the roll axis configuration.

In another aspect, a vehicular high-speed network system is provided, the device having an LS station utilizing a directional, or sector antenna that changes direction due to a rotary configuration. Thus, an advantage is a longer range for the connection because the directional antenna has a longer range compared to omni-directional antennas.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
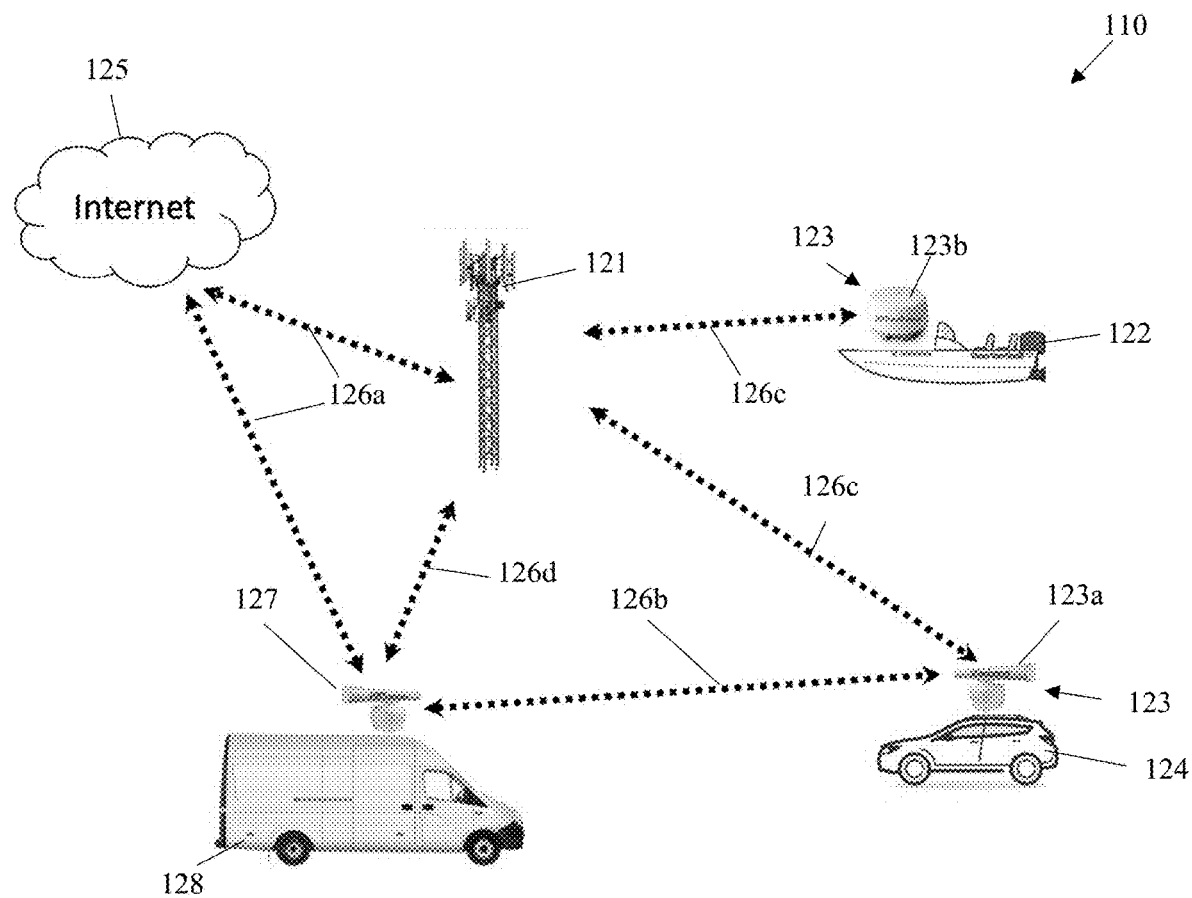
FIG. 1 is a diagram of a vehicular high-speed network system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH™ networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network.

For the following description, it can be assumed that most correspondingly labeled elements across the figures (e.g., 123 and 223, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 is a diagram of a vehicular high-speed network system 110 with LS stations 121 and 127 and long-and-safe terminals ("terminals", "LS terminals") 123a and 123b in communication, according to an aspect. As shown, the stationary long-and-safe station ("station", "LS station", "fixed base station") 121 may have a line of communication 126c with the mobile LS terminal 123 on both a terrestrial vehicle 124 and maritime vehicle 122. The stationary LS station 121 also may have a line of communication 126d with the with the mobile LS station 127, which may be placed on a vehicle 128. The mobile LS station 127 and the stationary LS station 121 both have a line of communication 126a to the cloud (or the Internet) 125. This line of communication 126a allows for these LS stations to receive Internet access and to later provide Internet access to the LS terminals 123a and 123b.

Figure 9:
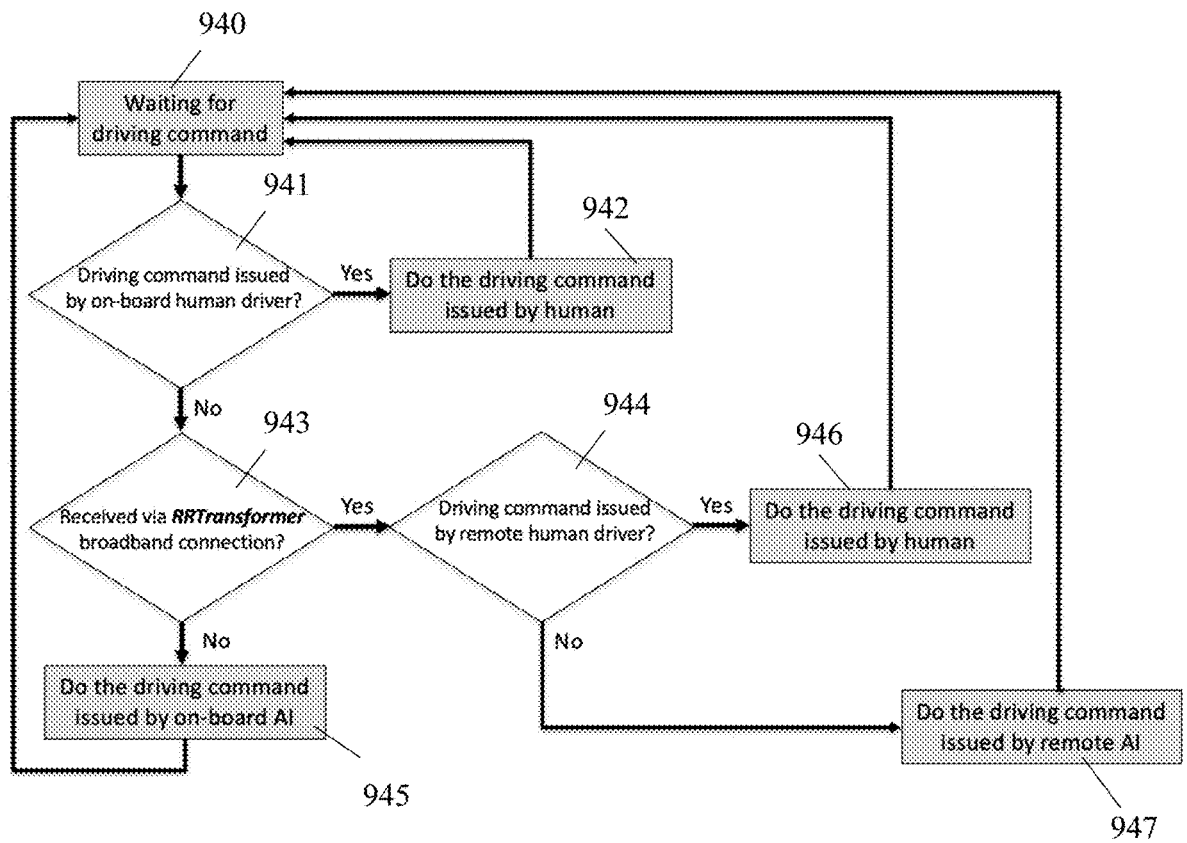
FIG. 9 is an operational flowchart diagram depicting an autonomous vehicle command process disclosed herein, according to an aspect.

The stationary LS station 121 may have a multitude of vertically placed sector antennas to cover up to 25 km radius on earth's ground and maritime surface. The stationary LS station 121 may function as a base station for a commercial wireless network. The stationary LS station 121 may provide real-time (i.e., less than 10 millisecond delay) MPEG video-capable (greater than 2 Mbps) network service for vehicles. As shown, in one example the stationary LS station 121 may be a tower like structure. The stationary LS station 121 may also have vertical antennas surrounding the tower as in conventional base stations. For example, the stationary LS station 121 may be like a cellular data network's (e.g., 3G, 4G networks) cell towers present beside the highway and around the corners of residential areas. The LS stations 121 and 127 may be equipped with super-computers and advanced servers such as an AI self-driving system, which is as shown in FIG. 9, and as it will be described when referring to FIG. 9.

The mobile LS station 127 has the benefits described above for the stationary LS station 121, but the station may have a moving capability. The mobile LS station 127 has a horizontally placed sector antenna. The horizontally placed antenna allows for an LS connection 126b between the mobile LS stations 127 and the LS terminals 123 for both terrestrial vehicles 124 and maritime vehicles 122. By integrating a horizontally placed sector antenna on a digitally controlled mechanical rotary unit, the horizontally placed antenna also allows for the antenna signal to cope with +/−60-degree pitch-axis movement of the underlying vehicle.

The LS terminal 123 may be used on common vehicles (e.g. automobiles, boats, ships, buoys, rotorcrafts and blimps) being served by the LS station connections 126a-d. However, the LS terminal 123 may not service other surrounding vehicles. The mobile LS station 121 may function as an LS terminal (i.e. radio rate transformer of FIG. 2) 123 because of the incorporated hardware, but an LS terminal 123 may not act as and LS station 121 because the terminal may be missing many of the station components. In an example, the stationary LS station 121 may be put on the side of the road and may be installed every 30 km to allow for more network coverage. In another example, an LS station 121 may be installed at top of hill and the LS terminals 123 may communicate with it. An LS station 121 on top of a hill may limit the amount of interference the signal may have. If the LS station 121 was in the valleys in between hills the LS terminals 123 would need a line of sight connection through these said hills, which may cause connection issues.

In an example, the LS stations 121 and 127 may cover up to 15 km radius for constantly moving vehicles, and up to 30 km radius for stop-and-go vehicles (which only transmit wireless signals when the vehicles are stopped, i.e., temporary fixed sources defined by FCC-13-39A1 pg. 3500).

It should be noted that the system may be seen as being a radio rate transformer, which transforms a low-rate VHF/UHF radio link into a high-rate gigahertz broadband radio link. Typically, in an electric transformer box electric current of low voltage may be transformed into high voltage through electromagnetic effects, in a radio rate transformer a low-rate VHF/UHF radio link may be transformed into a high-rate gigahertz broadband radio link.

Figure 2:
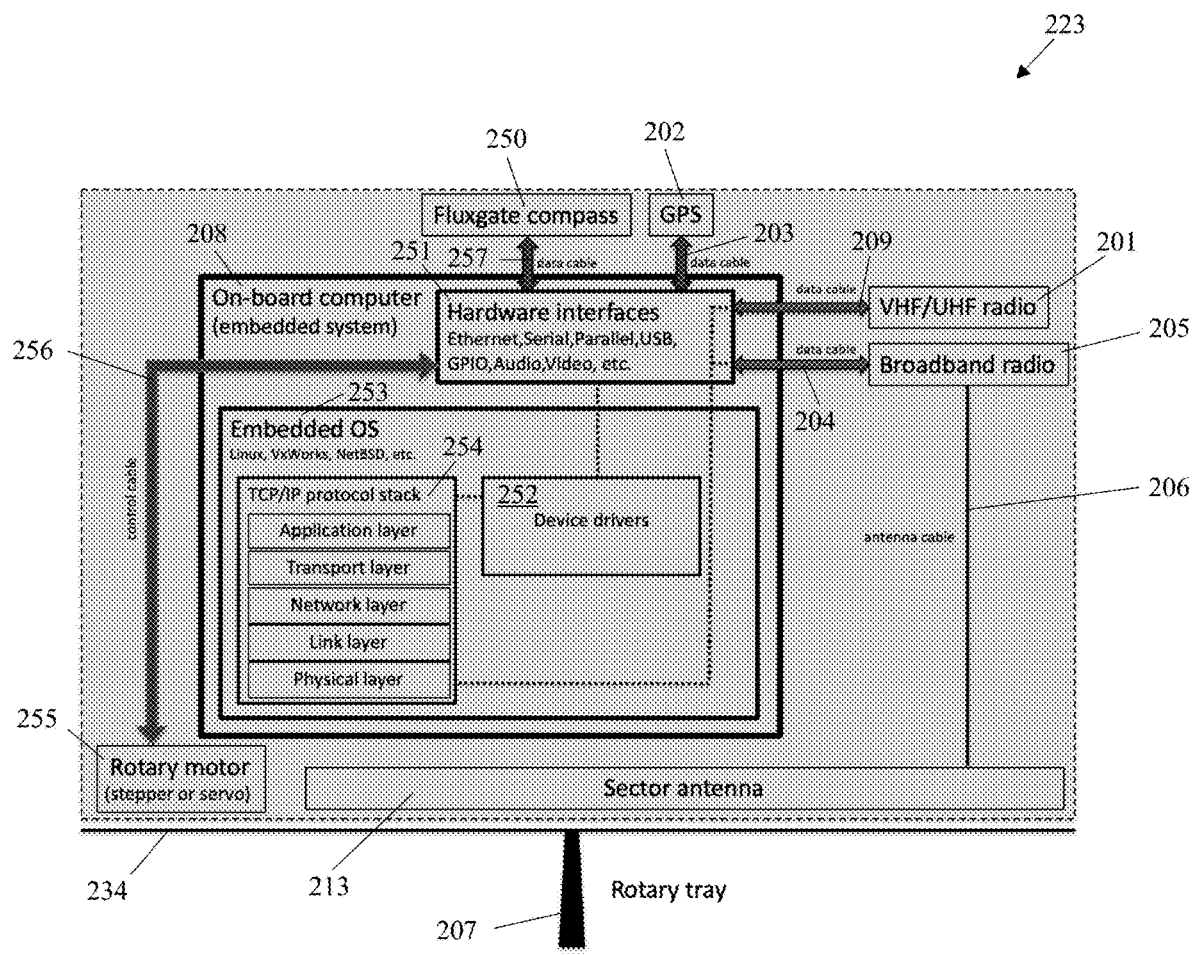
FIG. 2 is a diagram of the radio rate transformer device according to an aspect.

FIG. 2 is a diagram of a radio rate transformer, or LS terminal 223, according to an aspect. The radio rate transformer 223 may use a VHF/UHF radio 201 and a GPS device 202 to communicate where the point of service may be in the relative vicinity of an LS station. This may allow the on-board computer 208, which may be an embedded computer system, to communicate with the sector antenna 213 and the rotary tray 207 to align the system with the point of service. As shown, the radio rate transformer 223 may utilize a rotary tray 207 to rotate the network communication system when the command is given by the embedded computer system 208. This alignment may allow for a line of sight connection between the LS stations and the vehicle to provide a high-speed network connection from the broadband radio 205. In an example, the vehicular high-speed network system 110 applies sector antennas 213, which are a special kind of beam-forming directional antenna used in telecommunication base station towers, to provide sectional coverage of a spatial region and are usually deployed in its vertical position. However, the sector antennas 213 may be deployed in horizontal position in the radio rate transformer 223.

Figure 3:
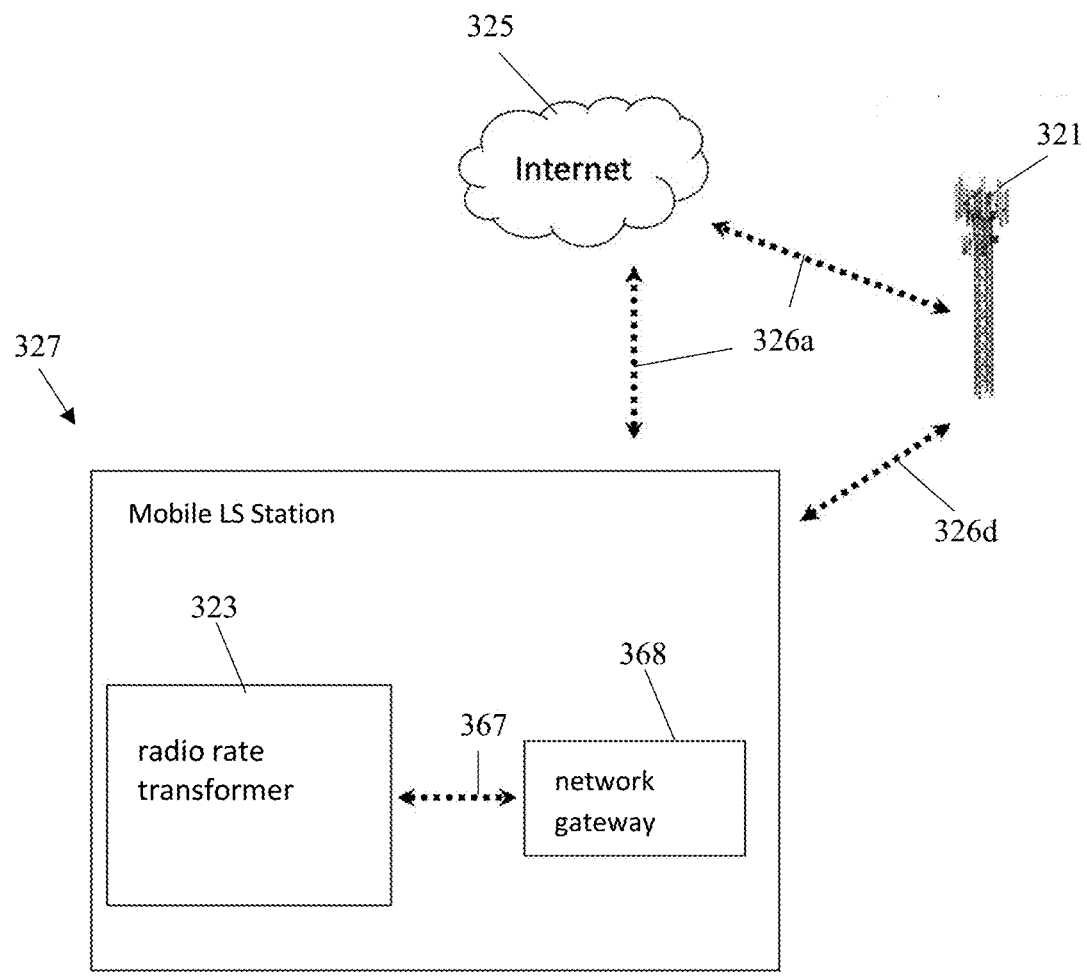
FIG. 3 is a diagram of the mobile LS station and its network connection, according to an aspect.

The radio rate transformer 223 may be implemented in both mobile and stationary LS stations along with the LS terminal. The stationary LS station may use the mentioned components of the radio rate transformer 223 to provide high speed connection to the vehicle along with a network gateway as shown in FIG. 3, and as it will be discussed in reference to FIG. 3. The mobile LS station may also use the mentioned components of the radio rate transformer 223 to provide high speed connection to the vehicle, while also utilizing the network gateway. The LS terminal may use the mentioned components of the radio rate transformer 223 to accept high speed connection to the vehicle.

For example, the VHF/UHF radio 201 may be FCC compliant and may use an omni-directional antenna and low-rate (e.g., 1200 bps) link to broadcast control information proactively or reactively. The control information includes the current vehicle's GPS coordinates and optionally the distance-vector routing table. The transmission range of an 8-watt handheld radio may reach at least 20 km line-of-sight per field tests, while a 25-watt mounted radio may reach at least 30 km line-of-sight. The time lapse between two consecutive VHF/UHF broadcasts may be several minutes since it takes time for vehicles, such as automobiles, to move out of the 20 km to 30 km range. The transmission may be triggered either proactively by a periodic clock or reactively by measuring the distance travelled. In a proactive example, this parameter may be user-configurable in the range of 5 seconds to any number of days. In another example, the default setting may be 5 minutes, so that, in an error-prone wireless environment with 50% packet delivery ratio (packets successfully received to the total sent), the neighboring vehicles know the vehicle's GPS coordinates approximately every 10 minutes. In a reactive example, an LS vehicle may transmit its GPS coordinates wherever it has moved away a user-configurable threshold distance, e.g., 100 meters, from the place of its last transmission.

The gigahertz broadband radio 205 may be FCC compliant and may use a high-gain directional antenna and the acquired GPS coordinates of a neighboring target to establish a high-speed directional link. The term "target" may refer to either a neighboring vehicle who broadcasts its GPS coordinates using the VHF/UHF radio 201 or a fixed base station 121 (i.e. stationary LS station) at a known position indexed by a database. In a field test, it was proved that a fixed 30 dBm MikroTik mANTBox15s radio with 15 dBi sector antenna may achieve approximately 10 Mbps rate to another moving 21 dBm mANTBox15s with 15 dBi sector antenna at 14 km distance, or to another temporary fixed 30 dBm mANTBox15s with 15 dBi sector antenna at 18 km distance. The directional gigahertz radio system, or radio rate transformer 223 having an embedded computer system 208, a COTS broadband communication device 205, several rotary mechanical drivers 255, and an installation base 234.

The embedded computer system 208 may function as a network gateway for the vehicle's local area network. The embedded computer system 208 may also have a compass 250 to measure the current heading angle of the sector antenna 213, a GPS device 202 to acquire its own geolocation coordinates, and a TCP/IP protocol stack 254 to communicate with other network nodes. As shown the directional angle measurement function may be performed by a component such as fluxgate compass. For example, a KVH C100 fluxgate compass, with an accuracy of ±0.5 degree, may be used. When two vehicles communicate with each other, they may pre-store the other vehicle's initial location coordinates in the local storage of the embedded computer system 208 and exchange its current location coordinates with the other vehicle every T seconds, where T ranges from a few seconds for real-time pinpointing of fast-moving vehicles to several hours for beaconing the livelihood of stationary nodes like fixed base stations 121. A vehicle may calculate the heading angle towards the other vehicle based on both sets of coordinates, then aims its directional antenna 213 (i.e. "sector antenna") accordingly. In an example, the embedded computer system 208 maintains a table of all installed fixed LS stations coordinates and aims the directional antenna 213 towards the nearest LS station in the table. It should be understood from above the embedded computer system 208 has logic adapted to perform the functions described herein.

The embedded computer system 208, having hardware interfaces 251 such as Ethernet, serial, parallel, USB, GPIO, video, etc. and an embedded operating system 253 with a TCP/IP protocol stack 254 and device drivers 252 may be used to read coordinate data and command the system to adjust accordingly. As an example, for the on-board computer or embedded computer system 208 a Raspberry Pi platform may be used to run ARM Linux variants as the embedded OS 253. The GPS receiver 202 may be connected to the hardware interfaces 251, such as a USB interface or a general-purpose input/output GPIO interface, of the rotary on-board computer 208 (i.e. "embedded computer system"). The rotary motor 255 may use a stepper or servo motor for controlling the rotary 207, which may be connected to the hardware interface 251 of the rotary on-board computer 208. The rotary motor 255 may be connected to the hardware interfaces 251 by a control cable 256. The VHF/UHF radio 201 may be connected to the hardware interfaces 251 which could be either audio interface, if implemented as rotary on-board unit, or Ethernet interface, if implemented as a separated box of the rotary on-board computer 208. The broadband radio 205 may be connected to the hardware interface 251, such as the Ethernet interface, of the rotary on-board computer 208. The software may be running as an application in the application layer of the TCP/IP protocol stack 254.

"The nearest" metric may not necessarily mean the shortest distance. In another example, when stationary LS stations 121 are deployed the user may store the coordinates as a table in each vehicle's Internet access scenarios local storage. The embedded computer system 208 may select the nearest stationary LS stations' coordinates from the table and aims the directional antenna 213 towards the nearest stationary LS station. Once furnished with GIS (geographic information system) terrain capability, "the nearest" metric may be redefined to mean "the most optimal" metric, for example, to enforce the line-of-sight constraint by knowing the terrain and avoiding obstacles, and also to enforce various routing constraints in the routing protocol packets.

In an example where the line of sight between the terminal and the closest (or "most optimal") stationary or mobile station may be blocked by some temporary physical obstruction or other type of interference, the network link connection may be disrupted and may be restored upon the line of sight being reestablished. The LS terminal will always point its sector antenna 213 towards the "nearest" LS station. In case of an obstacle disrupting the line-of-sight between the terminal and the station, the link connection may not be working at the moment but will work immediately after the line-of-sight is cleared. During the disruption, the link layers of the TCP/IP protocol stack 254 of the two parties will see the link connection status may still be broken since the link layer protocol handshakes fail to complete, and the link connection status will be reported to upper layers of the protocol stack following TCP/IP protocol 254 specifications. Once the disruption is gone, the link connection status may be restored which allows the entire TCP/IP protocol stack 254 to proceed as usual.

Figure 5:
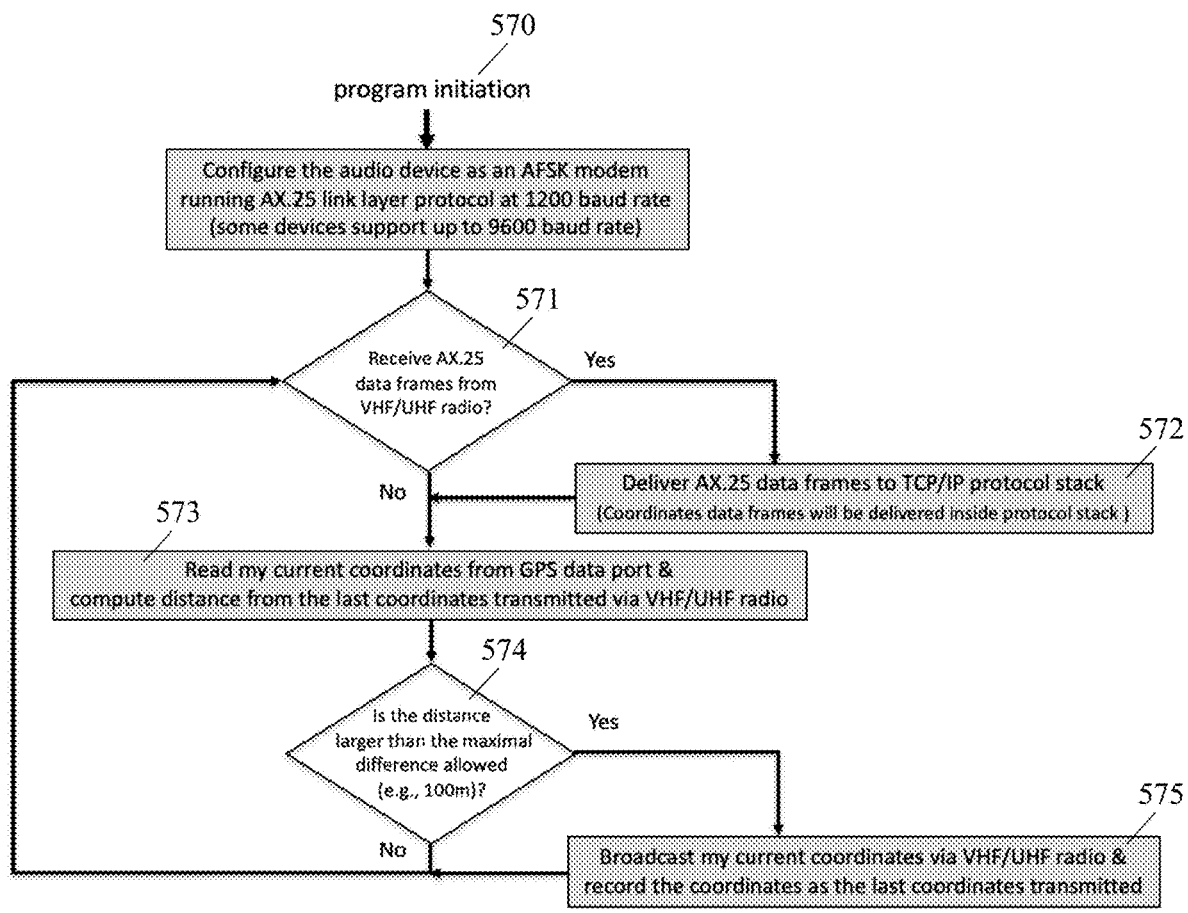
FIG. 5 is an operational flowchart diagram depicting the software program, within the embedded computer system, running the VHF/UHF digital radio of the system, according to an aspect.

Typically, the coordinate information of a vehicle is textual data, which may be about 320 bits in size. A location coordinate broadcast protocol based on the long-range VHF/UHF digital radio 201 allows for transmitting (i.e., sending and receiving, or, transceiving) data in 1200 bit-per-second speed and delivers the 320-bit textual data within a few seconds, which is as shown in FIG. 5, and as it will be described when referring to FIG. 5. The VHF/UHF digital radio channel may act as a control channel that exchanges important location information to establish the broadband data channel.

The broadband communication device 205 (i.e. broadband radio) may be an FCC-certified COTS product available from manufacturers, such as Ubiquiti and Mikrotik. In particular, a 15±2 dBi COTS sector antenna may typically be 0.35 meter in length/diameter and weighs about 1 kilogram or a 20±2 dBi COTS sector antenna may typically be 0.75 meter in length/diameter and weighs about 5 kilograms may be used.

The sector antenna's horizontal rotary 207 may be a mechanical driver coping with yaw-rotations, which may utilize a slip-ring device to accomplish unbounded rotations around the yaw-axis. The horizontal rotary plate 234 may be fastened to the upper half of a rotary bearing (e.g., a lazy Susan bearing). The installation base 234 may be fastened to the lower half of the rotary bearing. Optionally, (not shown) the entire system may be enclosed in an external radome cover for maritime use and weather-proof purposes.

As depicted, the VHF/UHF radio 201, such as a Baofeng UV-5R with 2.15 dBi omni-directional antenna, a gigahertz broadband radio 205, such as a Ubiquiti Rocket M5 transceiver and AM-5G16-120 sector antenna, and a GPS receiver 202 are all placed together on a mechanical rotary 207, which may be enclosed in a radome cover. The VHF/UHF radio 201 in the system may use an omni-directional antenna, which means it may not be necessary to place it on the rotary 207 designed for directional antennas.

The LS station and LS terminal both use the radio rate transformer 223. This means that the LS station may have a duel function of receiving broadband connections and sending it to other vehicles with the LS terminal attached.

FIG. 3 is a diagram of the mobile LS station 327 and its network connection, according to an aspect. The mobile LS station 327 contains the radio rate transformer 323 and the router functionality, or network gateway 368. FIG. 3 also shows the line of communication 326d between the mobile LS station 327 and the stationary LS station 321 along with the lines of communication 326a between the mobile LS station 327 and the stationary LS station 321 with the cloud (or the Internet) 325. As shown, the mobile LS station 327 may receive a broadband connection from either directly from the cloud or indirectly from the stationary LS station 321. For example, within the mobile LS station 327 the radio rate transformer 323 communicates to the network gateway 368 by a connection 367.

If the user has a multi vehicle caravan for example, a multiple wireless hop network may be implemented between an LS terminal and those stationary LS stations by adding mobile LS stations in-between. Without the mobile LS stations, any LS terminal must roam within a single wireless hop (i.e., up to 10 miles in my current implementation) of a stationary LS station. This significantly limits the mobility of LS terminals. Adding mobile LS stations effectively improves the mobility of LS terminals for users.

A mobile LS station 327 may feature a superset of hardware and functions of an LS terminal. More specifically, it has a network gateway device 368 to directly connect to the Internet (e.g., via satellite links or other long-haul links available in the working venue), or to connect to stationary LS stations which may eventually lead to the Internet. Like a stationary LS station, a mobile LS station 327 may have a network router 368 which forwards data packets for other nodes. On the contrary, an LS terminal may not forward data packets for other nodes. As its name implies, an LS terminal acts as a terminal node.

Figure 4:
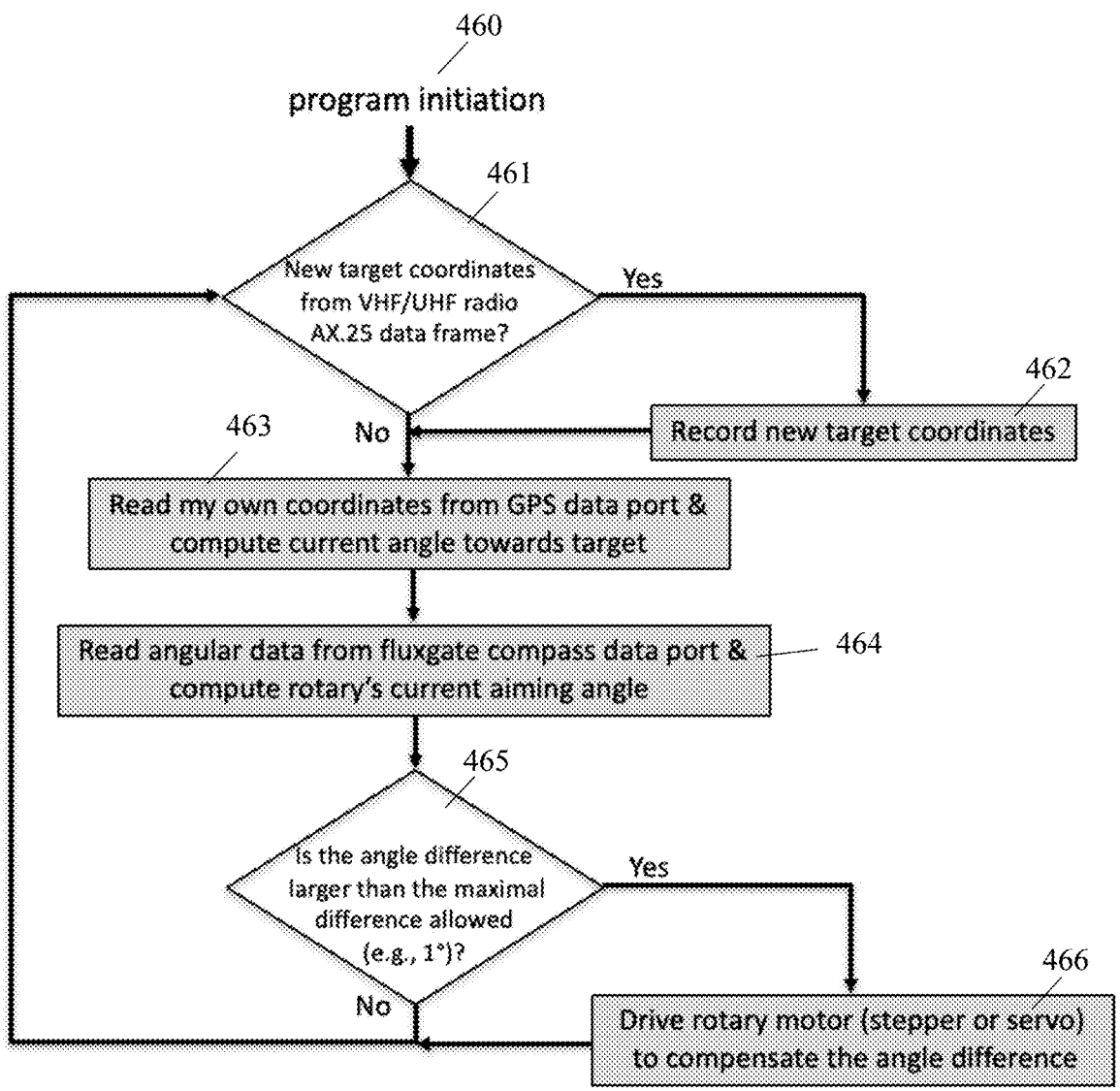
FIG. 4 is an operational flowchart diagram depicting the software program within the embedded computer system running the main controls of the system, according to an aspect.

FIG. 4 is an operational flowchart diagram depicting the software program within the embedded computer system running the main controls of the system, according to an aspect. In an example, the program may be initiated 460 and enter a command loop to monitor target coordinates from the VHF/UHF radio data frame and the rotary's current aiming angle from the fluxgate compass data port. If the system receives new target coordinates from the VHF/UHF radio AX.25 data frame 461 the system would record new target coordinates 462. If the system does not receive new target coordinates from the VHF/UHF radio AX.25 data frame 461 the current coordinates from the GPA data port are computed along with the current angle towards the target 464. If the angle difference is larger than the maximal difference allowed (e.g., one degree) 465 the drive rotary motor (a stepper or servo) may adjust to compensate for the angle difference 466. If the angle difference is not larger than the maximal difference allowed (e.g., one degree) 465 the system would wait for new target coordinates 461. If the angle difference between the current aiming angle from the fluxgate compass and the current target angle computing from the VHF/UHF radio about the target location and the GPS about the current location is larger than a threshold, which is the maximal angular difference allowed (default to one degree), then the system may drive the rotary motor to compensate the angle difference. The rotary motor may be implemented by either stepper motor or servo motor from the commercial-off-the-shelf market.

FIG. 5 is an operational flowchart diagram depicting the software program, within the embedded computer system, operating the VHF/UHF digital radio of the system, according to an aspect. In an example, the program may be initiated 570, which may allow for the software to configure the audio device as an AFSK modem running AX.25 link layer protocol at 1200 baud rate (i.e., 1200 bps). Typically, all audio devices adopted in the deployment may support 1200 baud rate and some high-end advanced devices may support up to a 9600 baud rate. If AX.25 data frames are received from the VHF/UHF radio 571 the AX.25 data frames may be delivered to the TCP/IP protocol stack 572. If AX.25 data frames are not received from the VHF/UHF radio 571 the current coordinates from the GPS data port may be used and the distance from the last coordinates transmitted via the VHF/UHF radio are computed 573. If the distance is larger than the maximal difference allowed (e.g., 100 meters) 574 the current coordinates are broadcasted, and the coordinates are recorded as the last coordinates transmitted 575. If the distance is not larger than the maximal difference allowed (e.g., 100 meters) 574 the system would wait for new data frames from the VHF/UHF radio 571. If the program detects that the underlying vehicle has moved away a distance that is larger than a threshold 574, meaning the difference between the current position and last-reported position is large enough, then it may transmit the current coordinates via the VHF/UHF radio, and record the transmitted coordinates as the last-reported position.

Figure 6:
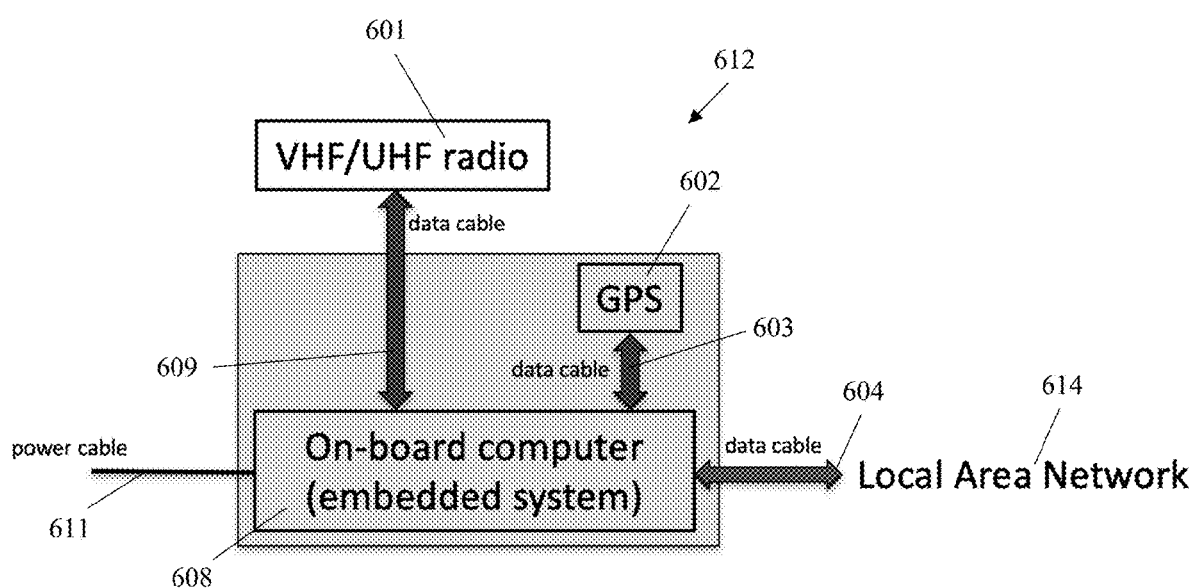
FIG. 6 is a diagram of a separated VHF/UHF digital radio system, according to an aspect.

FIG. 6 is a diagram of a separated box operating VHF/UHF digital radio system 612, according to an aspect. The digital radio system 612 may contain the VHF/UHF radio 601 and GPS 602 to communicate the vehicle's current location to other LS stations or LS terminals. The VHF/UHF radio 601 and GPS 602 may be in communication with the embedded computer 608 via data cables 603 and 609. The digital radio system 612 may also be connected to the vehicles local area network ("LAN") 614 by a data cable 604 which leads to other on-board computers including the one on rotary tray 208. The digital radio system 612 may be powered by a power cable 611.

As depicted in FIG. 6, the software operating VHF/UHF digital radio 601 may run inside the on-board computer box on the rotary tray or inside a self-contained separated box carried on vehicle, as long as the separated box and the radio rate transformer 223 are in the same vehicle. The separated box may be dedicated to the VHF/UHF radio 601, which may be used to exchange the GPS coordinates with the other end of a data link and communicate with the on-board computer 208 and local broadband radio 205 on the rotary via LAN 614, for example, 802.3 wired Ethernet LAN or 802.11 wireless LAN.

Figure 7:
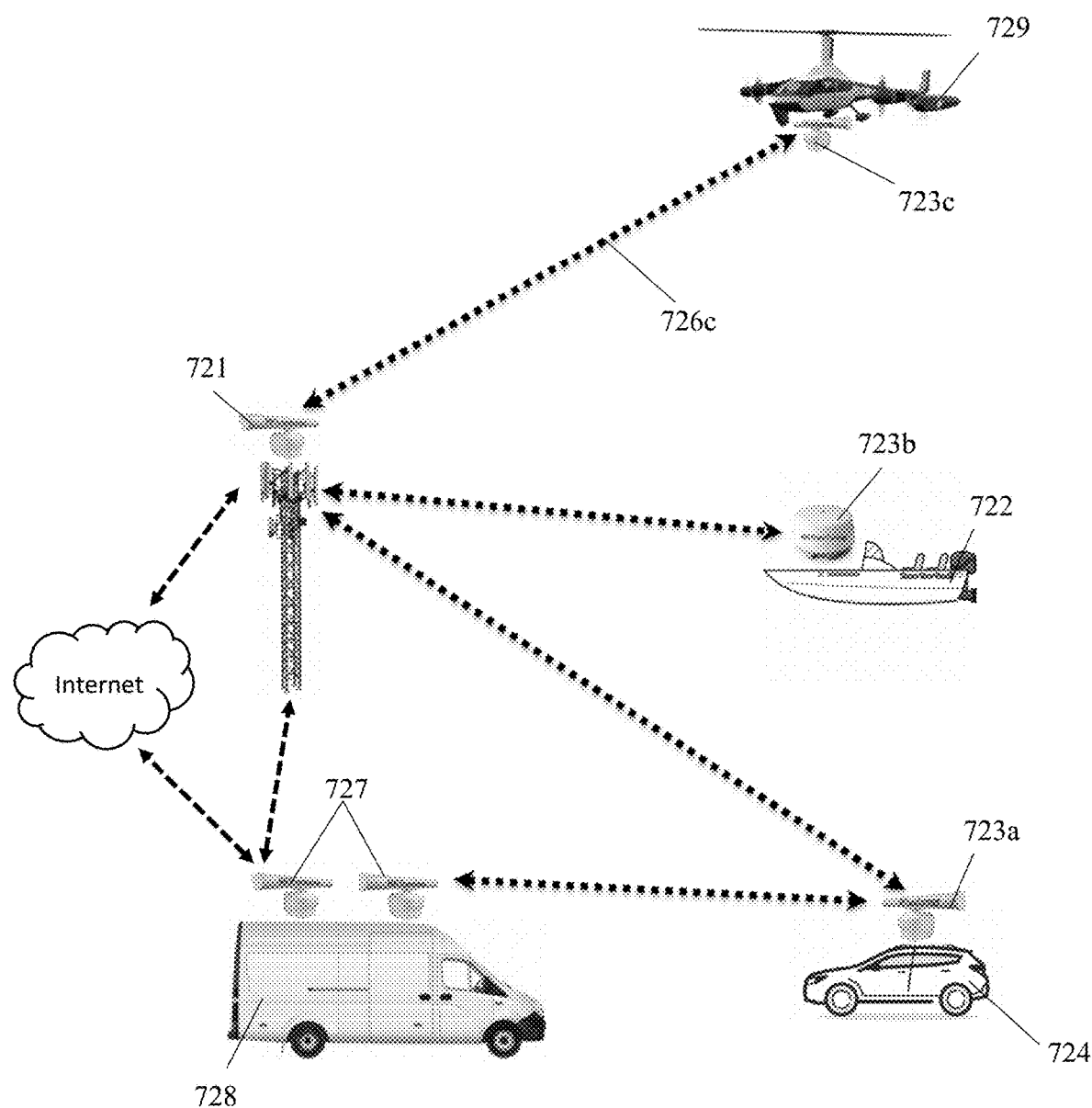
FIG. 7 is a diagram of the LS stations and LS terminals in communication, according to an aspect.

FIG. 7 is a diagram of the LS stations and LS terminals in communication, according to an aspect. As shown, the mobile LS terminal 723c could be in aerial form as it may be attached to an aerial vehicle 729. The mobile LS terminal 723c may have a 90-degree sector antenna facing 45-degree down to compensate for the longitudinal direction of the position of the vehicle in comparison to the LS station 721. The mobile LS terminal 723c acts in the way described above but may provide a network connection to aerial vehicles 729, by a line of communication 726c. Another configuration for the mobile LS station 727 may be having multiple vehicular broadband network communication systems in place on a terrestrial vehicle 728. Furthermore, in order to support communication to aerial vehicles an LS station (whether stationary or mobile) with an extra radio rate transformer may be needed. The extra radio rate transformer system may have a ≥90-degree sector antenna facing 45-degree up.

Shown again in FIG. 7 are the mobile LS terminal options 723a and 723b, which are also shown in FIG. 1 at 123a and 123b. It should be noted that FIG. 7 also shows an aerial vehicle 729, which may be supported by a stationary LS station 721. It should be understood that alternatively the aerial vehicle 729 may be supported by a terrestrial mobile LS station 727 or by an aerial mobile LS station (not shown) attached to an aerial vehicle (not shown; e.g. a plane). The LS terminal 723c may have the same benefits as the surface (terrestrial and maritime) vehicles 722 and 724 when the LS stations have an extra antenna 727 facing 45-degrees up to serve the aerial LS terminals 723c. Once the sector antenna is properly aligned, the maritime LS terminal 723b (e.g. a boat 722 having the terminal) and the aerial LS terminal 723c (e.g. a plane 729 having the terminal) would act in the same manner as the mobile LS terminal 723a for terrestrial vehicles 724.

Figure 8:
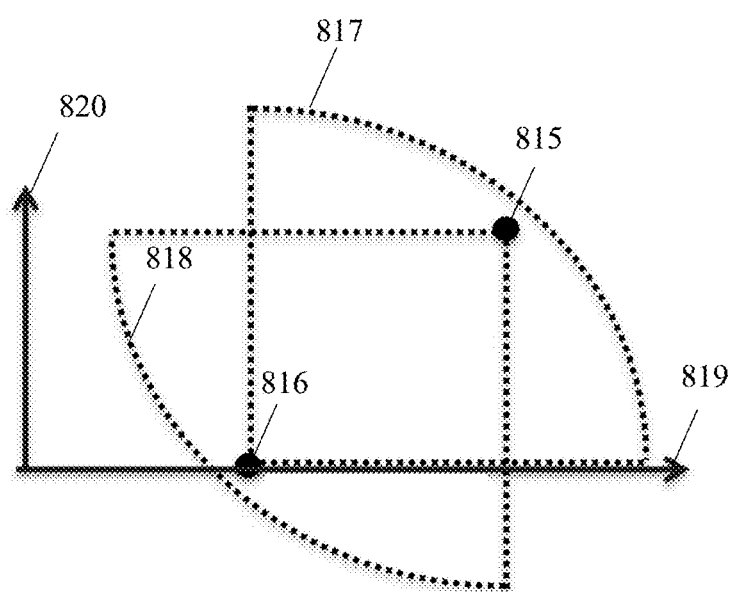
FIG. 8 is a diagram of the aerial path lines for the antennas at different altitudes, according to an aspect.

FIG. 8 is a diagram of the aerial path lines 817 and 818 for the antennas, according to an aspect. As shown, the path lines 817 and 818 for the antennas may need to have an overlapping connection area to ensure an aerial vehicle may receive the high-speed broadband connection. In an example to support aerial vehicles, a stationary or mobile LS station 816 may need to install an extra greater than or equal to 90-degree sector antenna (in horizontal position and facing 45-degree up) to cover up to 15 km radius upper-half-dome aerial space. The LS station 816 may be placed on the ground surface 819 while the aerial vehicle 815 is within the altitudinal dimension 820. On an aerial vehicle 815, a greater than or equal to 90-degree sector antenna (in horizontal position and facing 45-degree down) may be installed to cover up to 15 km radius lower-half-dome aerial space.

FIG. 9 is an operational flowchart diagram depicting an autonomous vehicle command process disclosed herein, according to an aspect. In an example, the autonomous vehicle is waiting for a driving command 940. If the driving command is issued by an on-board human driver 941 the autonomous vehicle would perform the driving command issued by the vehicle on-board human 942. If the driving command was not issued by the on-board human driver 941 and was not received from the system's broadband connection 943 the autonomous vehicle would perform the driving command issued by the on-board AI 945. If the driving command was not issued by the on-board human driver 941 and was received from the system's broadband connection 943 via a remote human driver 944 the autonomous vehicle would perform the driving command issued by the remote human 946. If the driving command was not issued by the on-board human driver 941 and was received from the system's broadband connection 943 not via a remote human driver 944 the autonomous vehicle would perform the driving command issued by the remote AI 947. The high-speed broadband connection may allow for the AI driving model to occur in real time, which may improve avoiding hazards on the road. In an example, providing the high-speed broadband to an AI vehicle computer system through the vehicular high-speed network system may prevent accidents because the high-speed data connection allows for faster reaction times. In another example, the LS stations may help vehicles equipped with LS terminals to improve driving safety, by reducing the driving error probability to a negligible quantity.

Figure 10:
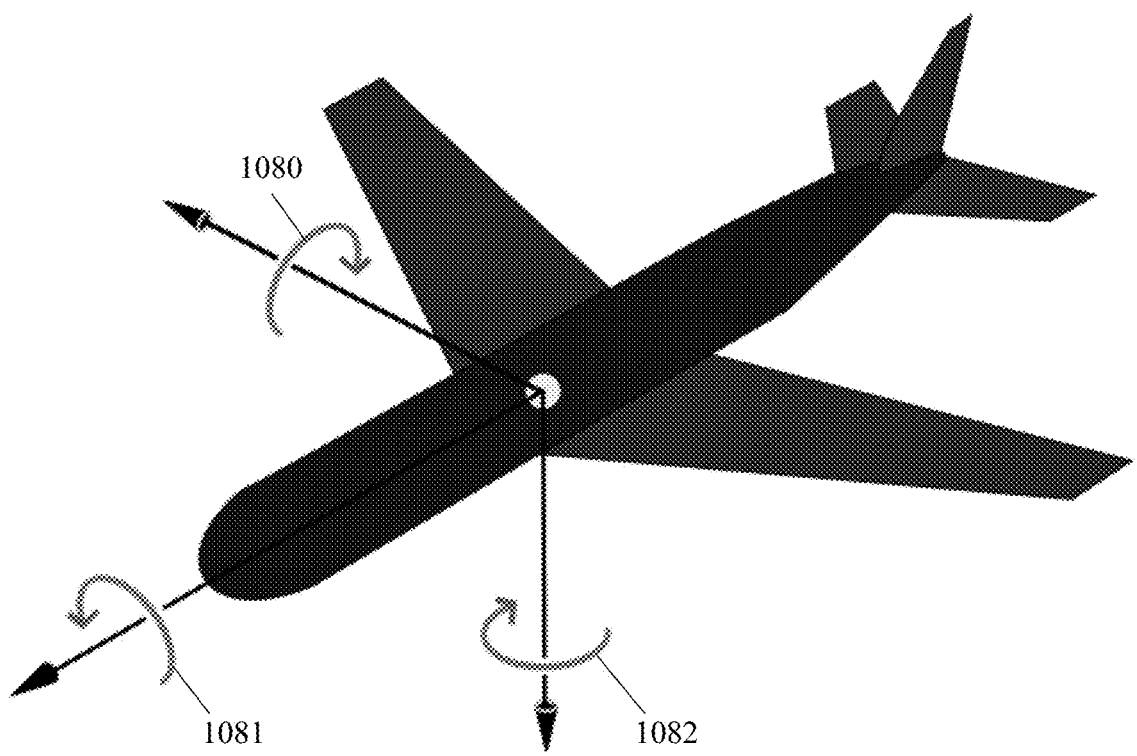
FIG. 10 is a diagram of a prior art naming convention for movement in the pitch, yaw, and rolling axis, according to an aspect.

FIG. 10 is a diagram of a prior art naming convention for movement in the pitch 1080, yaw 1082, and rolling 1081 axis, according to an aspect. This is the NASA naming convention of a three body axes of a vehicle. The pitch rotation 1080 is the grade or incline at which the vehicle is traveling. The yaw rotation 1082 is the vehicle's turning capability and how the steeling mechanisms of the vehicle limit the total amount of yaw rotation possible. The roll rotation 1081 is rolling of a vehicle, which for civilian vehicles should not interfere with the alignment of the other two rotations. However, civilian vehicle's may not have a roll over rate because they are not meant for rolling over.

Figure 11:
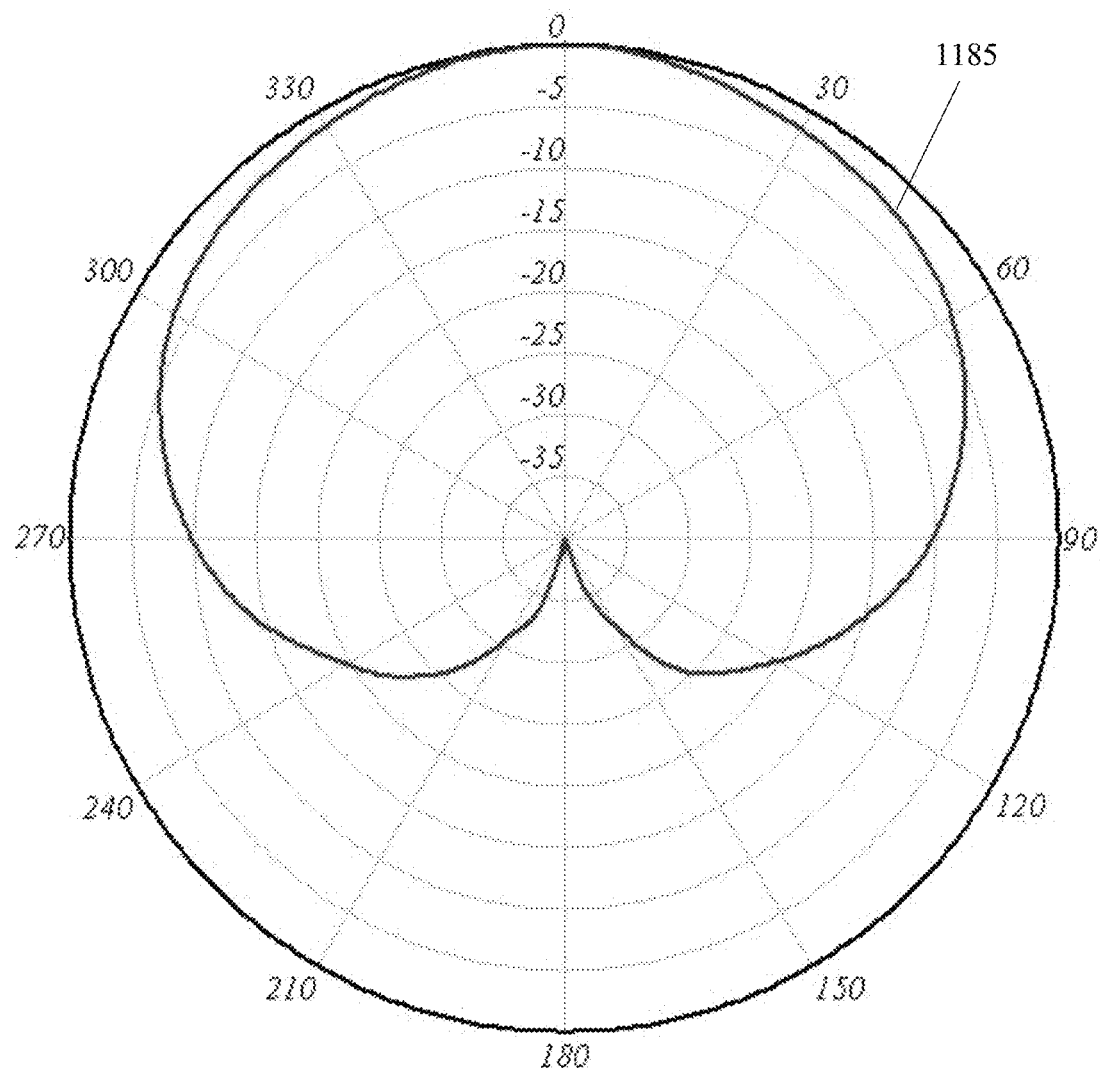
FIG. 11 is a graph of the azimuth radiation pattern of a sector antenna in its usual vertical position coving the horizontal areas, according to an aspect.
Figure 12:
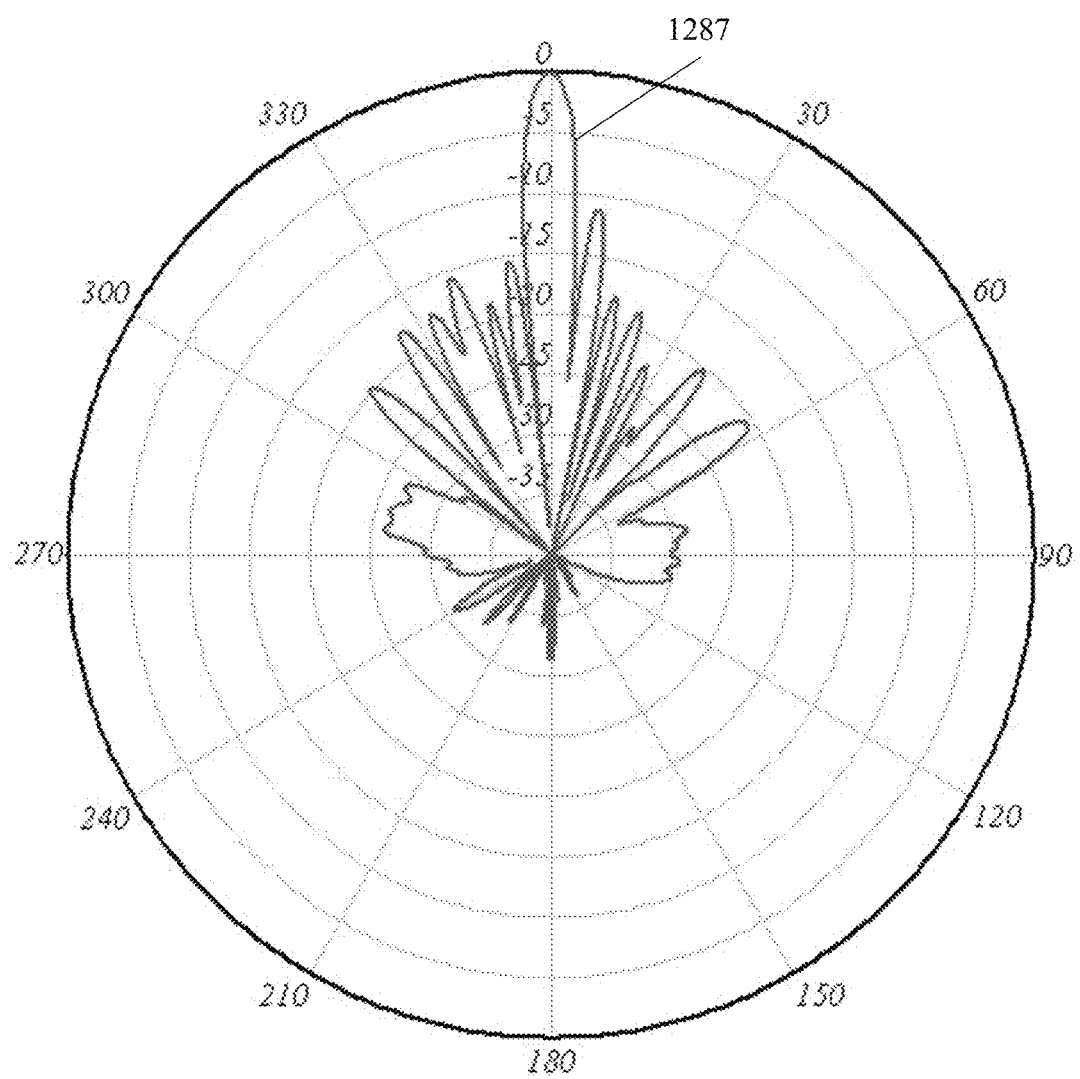
FIG. 12 is a graph of the elevation radiation pattern of a sector antenna in its usual vertical position covering vertical areas, according to an aspect.

FIG. 11 is a graph of the azimuth radiation pattern 1185 of a sector antenna in its typical position coving the horizontal areas, according to an aspect. FIG. 12 is a graph of the elevation radiation pattern 1287 of a sector antenna in its usual position covering vertical areas, according to an aspect. Sector antenna is a special kind of directional antenna used in telecommunication base station towers to provide sectional coverage of a spatial region. A sector antenna is usually deployed in its vertical position, which it may be deployed in the vertical position for the stationary LS station. At this usual position, the typical azimuth radiation pattern 1185 of the antenna is shown in FIG. 11 for covering a horizontal surface area, and the elevation radiation pattern 1287 shown in FIG. 12 for covering a vertical area. Per FIG. 11, each sector antenna covers a sector with a central angle of 2D degrees on the horizontal surface area, so sector antennas installed vertically on the same tower may cover the full circle around the yaw-axis.

Figure 13:
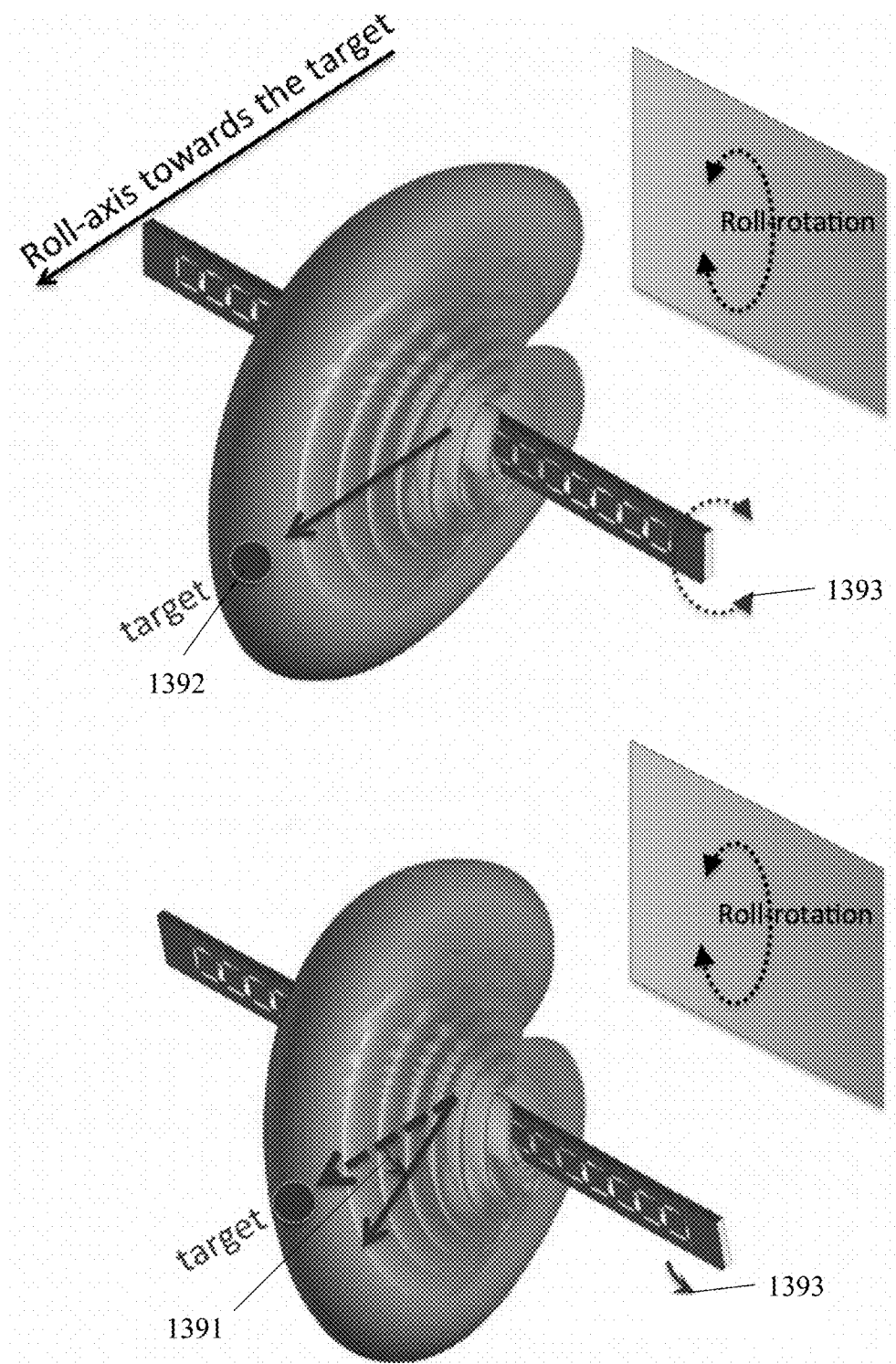
FIG. 13 is a diagram of the pitch and roll rotation's trivial impact on communication, according to an aspect.

FIG. 13 is a diagram of the roll and pitch rotation's trivial impact on communication, according to an aspect. The roll-rotation's impact on communication is trivial when pitch-rotations 1393 are within ±D degree sector 1391. In spite of arbitrary roll-rotations, the target receiver 1392 stays in the transmitter's radiation pattern whenever the pitch-rotation 1393 is within the range of ±D degree 1391 of the underlying sector antenna. Only when the pitch-rotation at the moment is out of the range of D degree 1391 will the radio transmission fail to reach the receiver.

The sector antenna and the radio transceiver unit installed in the system may be any COTS product, such as Ubiquiti's AirMAX & AirFiber product series, Cisco's AiroNet product series, etc. In an example, a COTS sector antenna with antenna gain in the range from 19 dBi (with ±60-degree sector) to 22 dBi (with ±22.5-degree sector) and a matching radio transceiver unit with transmission power in the range from 25 dBm to 28 dBm may be used. Such COTS sector antennas are typically 0.75 meter in length/diameter and weighs about 5 kilograms, while the radio unit is 0.3 meter in length and weighs about 0.5 kilogram. More specifically the combination of Ubiquiti's AirMAX AM-5G19-120 (19 dBi, ±60-degree sector), AM-5G20-90 (20 dBi, ±45-degree sector) or AM-V5G-Ti/60 (21 dBi, ±30 degree sector) sector antenna connected with a Ubiquiti Rocket M5 radio unit may be used. In a field test exercised at California sites show that the end-to-end TCP throughput from the mobile system to the home base-station may be about 10 Mbps for AM-5AC22-45 at 21-kilometer distance and for AM-5G19-120 at 17-kilometer distance.

In another example, a COTS sector antenna with antenna gain in the range from 14 dBi to 17 dBi and a matching radio transceiver unit with transmission power in the range from 25 dBm to 28 dBm may be used. Such COTS sector antennas are typically 0.35 meter in length/diameter and weighs about 1 kilogram, while the radio unit is 0.3 meter in length and weighs about 0.5 kilogram. More specifically the combination of Ubiquiti's AirMAX AM-5G16-120 (16 dBi, ±60-degree sector) or AM-5G17-90 (17 dBi, ±45-degree sector) sector antenna connected with an Ubiquiti Rocket M5 radio unit may also be used. In a field test exercised at California sites show that the end-to-end TCP throughput may be about 10 Mbps for AM-5G-17-90 at 16-kilometer distance and for AM-5G16-120 at 14-kilometer distance.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A vehicular high-speed network system comprising:
   a vehicle;
   a terminal associated with the vehicle and having a first radio rate transformer, the first radio rate transformer having a GPS device for providing GPS location data of the first radio rate transformer, an embedded computer system, a VHF/UHF radio connected to the GPS device for transceiving the GPS location data to the embedded computer system, a first sector antenna, a compass for providing a heading angle of the first sector antenna to the embedded computer system, and a broadband radio for establishing high-speed data connection;
   a rotary motor; and
   a plurality of stations, each having a second radio rate transformer connected to a network gateway, wherein each of the plurality of stations are connected to the Internet and adapted to enable the high-speed data connection to the terminal once a second sector antenna of the second radio rate transformer has a line of sight connection with the first sector antenna;
   wherein, based on a command given by the embedded computer system, the first sector antenna can be adjusted by the rotary motor to complete the command given by the embedded computer system; and
   wherein the first sector antenna compensates for changes in pitch axis of a line of sight between the first sector antenna and the second sector antenna when the first sector antenna is placed horizontal to the ground.

2. The vehicular high-speed network system of claim 1, wherein each of the plurality of stations is mobile.

3. The vehicular high-speed network system of claim 1, wherein each of the plurality of stations is stationary.

4. The vehicular high-speed network system of claim 1, further comprising a rotary tray that can be engaged by the rotary motor when the command is received from the embedded computer system to adjust the first sector antenna to have the line of sight connection with the second sector antenna.

5. The vehicular high-speed network system of claim 3, wherein the second sector antenna is vertical to the ground.

6. A vehicular high-speed network system comprising:
   a vehicle;
   a terminal associated with the vehicle and having a first radio rate transformer, wherein the first radio rate transformer has a GPS device for determining GPS location data of the radio rate transformer, an embedded system, a VHF/UHF radio for transceiving the GPS location data to the embedded computer system, a first sector antenna, a rotary motor for adjusting the first sector antenna according to a command sent from the embedded system, and a broadband radio for receiving high-speed connection to the vehicle; and a plurality of stations, each having a second radio rate transformer connected to a network gateway, wherein each of the plurality of stations are connected to the Internet and adapted to enable the high-speed data connection to the terminal once a second sector antenna of the second radio rate transformer has a line of sight connection with the first sector antenna, wherein the first sector antenna compensates for changes in pitch axis of a line of sight between the first sector antenna and the second sector antenna when the first sector antenna is placed horizontal to the ground.

7. The vehicular high-speed network system of claim 6, wherein both the first and second radio rate transformers have a compass to determine a heading angle of the first sector antenna.

8. The vehicular high-speed network system of claim 6, wherein each of the plurality of stations is mobile.

9. The vehicular high-speed network system of claim 6, wherein each of the plurality of stations is stationary.

10. The vehicular high-speed network system of claim 9, wherein the second sector antenna is vertical to the ground.

11. A method for providing a high-speed network connection to vehicles comprising the steps of:
    determining current location coordinates of a terminal, via a GPS device, the terminal being associated with a vehicle;
    transmitting the current location coordinates via a VHF/UHF radio to an embedded computer system of a station;
    adjusting a first sector antenna of the terminal to have a line of sight with the station based on a command given by the embedded computer system, wherein moving of the first sector antenna is by using a rotary motor to complete the command given by the embedded computer system;
    establishing a high-speed network connection via a broadband radio through a second sector antenna of the station with the first sector antenna of the terminal; and
    compensating for the changes in pitch axis of a line of sight between the first sector antenna and the second sector antenna by placing the first sector antenna horizontal to the ground.

12. The method of claim 11, further comprising adjusting the second sector antenna of the station to have a line of sight with the current location coordinates of the terminal.

13. The method of claim 11, further comprising rotating a rotary tray attached to the first sector antenna with the rotary motor to have a line of sight with the second sector antenna.

14. The method of claim 11, further comprising finding the heading angle of the first sector antenna via a compass on the terminal.

15. The method of claim 11, wherein the adjusting comprises reading the current location coordinates of the terminal, computing the current angle of the first sector antenna, reading angular data from a compass, and computing a rotary tray's current aiming angle.

* * * * *